United States Patent
Zheng et al.

(10) Patent No.: US 12,390,795 B2
(45) Date of Patent: Aug. 19, 2025

(54) PREPARATION OF SUPPORTED METAL NANOPARTICLES USING POLYAMINE FOR THREE-WAY CATALYSIS APPLICATION

(71) Applicant: JOHNSON MATTHEY PUBLIC LIMITED COMPANY, London (GB)

(72) Inventors: Qinghe Zheng, Wayne, PA (US); Jing Lu, Wayne, PA (US); Michael Howard, Wayne, PA (US)

(73) Assignee: JOHNSON MATTHEY PUBLIC LIMITED COMPANY, London (GB)

(*) Notice: Subject to any disclaimer, the term of this patent is extended or adjusted under 35 U.S.C. 154(b) by 638 days.

(21) Appl. No.: 17/653,937

(22) Filed: Mar. 8, 2022

(65) Prior Publication Data

US 2022/0297095 A1    Sep. 22, 2022

Related U.S. Application Data

(60) Provisional application No. 63/200,642, filed on Mar. 19, 2021.

(51) Int. Cl.
*B01J 23/46* (2006.01)
*B01D 53/94* (2006.01)
(Continued)

(52) U.S. Cl.
CPC .......... *B01J 23/464* (2013.01); *B01D 53/945* (2013.01); *B01J 21/04* (2013.01); *B01J 23/10* (2013.01);
(Continued)

(58) Field of Classification Search
CPC .......... B01D 53/945; B01D 2255/1021; B01D 2255/1023; B01D 2255/1025; B01D 2255/2092; B01D 2255/407; B01D 2255/908; B01D 2255/9155; B01D 2255/9202; B01D 2258/014; B01J 21/04; B01J 23/002; B01J 23/10; B01J 23/42; B01J 23/44; B01J 23/464; B01J 23/63;
(Continued)

(56) References Cited

U.S. PATENT DOCUMENTS

| 4,292,199 A | 9/1981 | Rohrbach et al. |
| 9,579,636 B1 * | 2/2017 | Roy .......................... B01J 37/16 |

(Continued)

FOREIGN PATENT DOCUMENTS

| WO | 2007105052 A2 | 9/2007 |
| WO | 2016123523 A1 | 8/2016 |
| WO | 2016123534 A1 | 8/2016 |

OTHER PUBLICATIONS

Kuwahara, Y.; Kango, H.; Yamashita, H. Pd Nanoparticles and Aminopolymers Confined in Hollow Silica Spheres as Efficient and Reusable Heterogeneous Catalysts for Semihydrogenation of Alkynes. ACS Catal. 2019, 9 (3), 1993-2006.
(Continued)

*Primary Examiner* — Dapinder Singh (57) ABSTRACT

A method of manufacturing a catalyst article, the method comprising: providing a complex of a polyamine and a PGM; providing a support material; applying the complex to the support material to form a loaded support material; disposing the loaded support material on a substrate; and heating the loaded support material to form nanoparticles of the PGM on the support material.

22 Claims, 8 Drawing Sheets

(51) Int. Cl.
   B01J 21/04        (2006.01)
   B01J 23/10        (2006.01)
   B01J 23/42        (2006.01)
   B01J 23/44        (2006.01)
   B01J 35/00        (2006.01)
   B01J 37/00        (2006.01)
   B01J 37/03        (2006.01)
   B01J 37/04        (2006.01)
   B01J 37/08        (2006.01)
   F01N 3/10         (2006.01)
   F01N 3/28         (2006.01)
   F01N 13/18        (2010.01)
   B01J 35/56        (2024.01)

(52) U.S. Cl.
   CPC ............... *B01J 23/42* (2013.01); *B01J 23/44* (2013.01); *B01J 35/19* (2024.01); *B01J 37/0009* (2013.01); *B01J 37/038* (2013.01); *B01J 37/04* (2013.01); *B01J 37/082* (2013.01); *F01N 3/101* (2013.01); *F01N 3/2803* (2013.01); *F01N 3/2842* (2013.01); *F01N 13/18* (2013.01); *B01D 2255/1023* (2013.01); *B01D 2255/1025* (2013.01); *B01D 2255/2092* (2013.01); *B01D 2255/407* (2013.01); *B01D 2255/908* (2013.01); *B01D 2255/9155* (2013.01); *B01J 35/56* (2024.01); *F01N 2370/04* (2013.01)

(58) Field of Classification Search
   CPC .... B01J 35/56; B01J 37/0009; B01J 37/0018; B01J 37/0203; B01J 37/0215; B01J 37/035; B01J 37/038; B01J 37/04; B01J 37/082; B01J 37/086; B01J 37/088; F01N 3/101; F01N 3/2803; F01N 3/2842; F01N 13/18; F01N 2370/04; Y02T 10/12
   See application file for complete search history.

(56) References Cited

U.S. PATENT DOCUMENTS

| | | | |
|---|---|---|---|
| 9,687,818 | B2 | 6/2017 | Siani |
| 10,201,804 | B2 * | 2/2019 | Karpov ............... B01J 37/0221 |
| 2007/0060473 | A1 * | 3/2007 | Saito ................ B01D 53/9422 |
| | | | 502/340 |
| 2008/0242533 | A1 * | 10/2008 | Saito ..................... B01J 23/40 |
| | | | 502/171 |
| 2008/0268159 | A1 | 10/2008 | Hirata |
| 2012/0077669 | A1 | 3/2012 | Müller-Stach |
| 2016/0175937 | A1 | 6/2016 | Xia |

OTHER PUBLICATIONS

Long, W.; Brunelli, N. A.; Didas, S. A.; Ping, E. W.; Jones, C. W. Aminopolymer-Silica Composite-Supported Pd Catalysts for Selective Hydrogenation of Alkynes. ACS Catal. 2013, 3 (8), 1700-1708.

* cited by examiner

PREPARATION OF SUPPORTED METAL NANOPARTICLES USING POLYAMINE FOR THREE-WAY CATALYSIS APPLICATION

FIELD OF THE INVENTION

The invention relates to a method of manufacturing a catalyst article, a catalyst article obtainable by the method, an emission treatment system and a method of treating an exhaust gas.

BACKGROUND OF THE INVENTION

A three-way catalyst (TWC) allows simultaneous conversions (~98%) of CO, HCs and $NO_x$ from gasoline engine exhaust to innocuous compounds at stoichiometric air-to-fuel ratio. Specifically, the oxidation of CO and HCs to $CO_2$ and steam ($H_2O$) is mainly catalyzed by Pd, while the reduction of $NO_x$ to $N_2$ is mainly catalyzed by Rh. Modern TWCs use supported platinum group metal (hereinafter "PGM") catalysts (Pd, Rh, Pt, etc.) deposited on a single, double or multilayer support, with the support material consisting of metal oxides with high specific surface area, primarily stabilized gamma alumina and ceria-containing oxygen storage materials. The supported catalyst is washcoated on a ceramic monolithic substrate.

Conventional preparation of a TWC washcoat slurry generally involves the use of a solution of an inorganic PGM precursor, e.g. nitrate, acetate, or chloride salt, to allow the PGM element to be deposited onto the oxide support via incipient wetness or wet impregnation. Promoter salts are also often added to the washcoat formulations for enhanced TWC performance. Once the monolithic substrate is washcoated with the as-prepared slurry, drying and calcination steps are followed to decompose the inorganic salts and to allow PGM and promoter elements to be fixed onto the support materials. It is known that the performance of supported metal catalysts depends on the structure and composition of the metal nanoparticles, and the nature of the support. Conventional TWCs prepared using the above method often provide only limited control over the structure of the catalytically active species (i.e. average PGM particle size and composition, location of the active components, and metal-support interactions). This is mainly due to metal migration and grain growth during high temperature calcination process.

With increasingly stringent environmental regulations, TWCs with higher emissions abatement efficiency are needed. On the other hand, with increasing PGM cost, there is an urgent need of reducing PGM loading without comprising TWC performance. A better control of the PGM particle size and metal-support interaction is essential in optimizing the TWC performance. Furthermore, a uniformed PGM particle size distribution may contribute to a reduction in the extent of metal sintering due to Ostwald Ripening, as often occurs during a fuel cutoff process, an engine strategy used for enhanced fuel economy.

The catalyst light-off is the minimum temperature necessary to initiate the catalytic reaction. In particular, the light-off temperature is the temperature at which conversion reaches 50%. There is a need for catalyst articles with reduced light-off temperatures.

US 2012/0077669 A1 describes a polymer-assisted synthesis of a supported metal catalyst for automotive applications. The polymers used in the examples include poly(vinylpyrrolidone), poly(acrylic acid), and poly(ethyleneimine). In the described synthesis procedures, the support (alumina powder) is first impregnated with a polymer-containing aqueous solution. The impregnated support is then separated from the above solution by filtration and drying steps. The dried impregnated support is further impregnated with a PGM precursor solution by incipient wetness impregnation. The as-described process involves multiple steps for the formation of as-claimed supported metal catalysts, which increases the cost and difficulty for commercial-scale production. US 2012/0077669 A1 indicates that a lean burn engine is preferably used, such as a diesel engine or a lean burn gasoline engine, for the application of the technology.

SUMMARY OF THE INVENTION

One aspect of the present disclosure is directed to a method of manufacturing a catalyst article, the method comprising: providing a complex of a polyamine and a PGM; providing a support material; applying the complex to the support material to form a loaded support material; disposing the loaded support material on a substrate; and heating the loaded support material to form nanoparticles of the PGM on the support material.

Another aspect of the present disclosure is directed to a catalyst article obtained by the method in the first aspect.

The invention also encompasses an exhaust system for internal combustion engines that comprises the catalyst article in the second aspect.

DETAILED DESCRIPTION OF THE INVENTION

The present invention seeks to tackle at least some of the problems associated with the prior art or at least to provide a commercially acceptable alternative solution thereto.

In a first aspect, the present invention provides a method of manufacturing a catalyst article, the method comprising:
providing a complex of a polyamine and a PGM;
providing a support material;
applying the complex to the support material to form a loaded support material;
disposing the loaded support material on a substrate; and
heating the loaded support material to form nanoparticles of the PGM on the support material.

Each aspect or embodiment as defined herein may be combined with any other aspect(s) or embodiment(s) unless clearly indicated to the contrary. In particular, any features indicated as being preferred or advantageous may be combined with any other feature indicated as being preferred or advantageous.

Surprisingly, when used in an emission treatment system, the catalyst article manufactured by the method of the present invention may exhibit favourable catalytic activity, in particular favourable three-way catalytic activity. For example, the catalyst article may exhibit favourable light-off performance, in particular conversions of NO, CO and total hydrocarbons, during three-way catalytic emissions abatement for a stoichiometric gasoline engine. Such favourable catalytic activity and light-off performance may be superior to that exhibited by conventional catalyst articles with the same/similar PGM specie(s), loading(s), support(s), and configuration(s). The catalyst article may be more durable in comparison to conventional catalyst articles. In other words, such favourable catalytic activity may be exhibited even after aging.

Advantageously, such superior performance may facilitate the use of lower loadings of PGMs in comparison to conventional catalyst articles without compromising catalytic performance. This may be beneficial in view of the high cost of such metals, in particular rhodium. Furthermore, such superior performance may facilitate the partial/complete substitution of high cost PGMs with lower cost PGMs or other transition metals without compromising catalytic performance.

Without being bound by theory, it is hypothesised that such superior performance may be provided by a favourable particle size distribution of the PGM nanoparticles on the support material. During PGM-polyamine complexation, ions of PGM may react with amine functional groups, with the same predictable amount of PGM ions "uptaken" by each polymer unit structure, wherein the total amount of PGM "uptaken" is determined by the polymer molecular structure/size and PGM-polyamine coordination ratio. Each complex may then react/interact with surface functional groups (e.g. hydroxyl groups) or surface charges to allow "anchoring" of PGM-polyamine complexes onto the support material surface. The "anchored" PGM-polyamine complexes may be separated apart due to polymeric steric effects and the available amount of support material surface functional groups/charges. The interaction between the complex and support material functional groups may increase PGM uptake by the support, compared to catalyst prepared by conventional methods. Without being bound by theory, it is also hypothesized that such even separation may lead to a narrower particle size distribution of PGM nanoparticles (more uniformed particle sizes) upon heating (calcination), which further leads to a reduction in excess agglomeration and/or sintering of PGM particles during ageing and/or fuel-cut events. In other words, compared to conventional catalyst, a more sintering-resistant catalyst article may be obtained by using the method of the present invention.

In comparison to the method of US 2012/0077669 A1, the method of the present invention is a simpler and more efficient "one-pot" method. The method of the present invention does not require separate impregnation, filtration, and drying steps for depositing the polymer molecules onto the support material. By using the method of the present invention, the yield of polymer-support and PGM-polymer interactions may increase because each polymer molecule added is utilized for interactions. In contrast, in US 2012/0077669 A1, only limited amount of polymers may stay on the support after the filtration and washing steps. Furthermore, the catalyst article prepared by the method of the present invention may be specifically used as a three-way catalyst for stoichiometric gasoline emissions abatement. In contrast, the catalyst article made by the method of US 2012/0077669 A1 has a particular application in lean burn diesel or gasoline engines.

The term "catalyst article" used herein may encompass an article in which a catalyst is supported thereon or therein. The article may take the form of, for example, a honeycomb monolith, or a filter, e.g. a wall flow filter or a flow-through filter. The catalyst article may be for use in an emission treatment system, in particular an emission treatment system for a gasoline engine, preferably a stoichiometric gasoline engine. The catalyst article may be for use in three-way catalysis.

Providing a complex of a polyamine and a PGM typically involves providing the complex in solution, for example an aqueous or alcohol solution. Providing a complex of a polyamine and a PGM typically involves mixing inorganic PGM precursor(s) and polyamine in pure or solution form in an aqueous medium, for example mixing PGM nitrate and polyamine in water.

The term "polyamine" as used herein may encompass a class of polymers bearing ionisable amine moieties, such as primary, secondary, and tertiary amines. The polyamine may comprise branched polyamine and/or linear polyamine, but preferably comprises branched polyamine. The polyamine may be in dendrimeric form.

The term "platinum group metal" or "PGM" as used herein may encompass ruthenium, rhodium, palladium, osmium, irridium and platinum. The PGM may comprise one of these metals. Alternatively, the PGM may comprise two or more of these metals. The PGM may be in the form of an alloy.

The complex may have a PGM to amino group ratio of from 1:1 to 1:10, preferably from 1:2 to 1:8, more preferably from 1:5 to 1:7.

The support material may be any material that is capable of supporting the complex and nanoparticles thereon on therein. The support material may take any form, but is typically in the form of a powder, more typically a high surface area powder. When the method of the present invention is used to prepare a catalysed filter, such as a wall flow filter or flow-through filter, the support material will typically be in the form of a powder having a D50 of, for example, from 0.1 to 25 µm, more typically from 0.5 to 5 µm as measured using TEM. Such particle sizes may facilitate desirable rheological properties of a slurry used to coat the filter. The support material may function as a washcoat. The support material may be a washcoat or may be part of a washcoat.

The support material may also serve as an oxygen storage material, which stores and releases oxygen respectively at fuel lean and fuel rich conditions, for facilitating the three-way catalytic conversion.

Applying the complex to the support material typically involves contacting the complex and support material in the presence of a solvent (typically water) so as to produce a slurry. The term "slurry" as used herein may encompass a liquid comprising insoluble material, e.g. insoluble particles. The slurry may comprise (1) solvent; (2) soluble content, e.g. unreacted polyamine polymer, inorganic PGM and promoter precursor(s), and PGM-polymer complex (outside of the support); and (3) insoluble content, e.g. support particles with and without interactions with the polymer and metal precursors. The slurry is typically stirred, more typically for at least 10 minutes, more typically for at least 30 minutes, even more typically for at least an hour. Increased contacting and/or stirring times may increase the amount of complex that is loaded onto the support material.

The term "loaded support material" as used herein may encompass a support material that has the PGM-polyamine complex loaded thereon (e.g. on the surface of a high-surface area metal oxide support material) and/or loaded therein (e.g. within the pores of a zeolite support material). The complex is typically fixed to the support, for example by electrostatic forces, hydrogen bonds, coordinate bonds, covalent bonds, and/or ionic bonds. For example, in the case of an oxide, amine functional groups in the polyamine and surface hydroxyl groups on the support may interact through electrostatic forces or hydrogen-bond formation.

The term "substrate" as used herein may encompass, for example, a ceramic or metallic honeycomb, or a filter block, e.g. a wall flow filter or flow-through filter. The substrate may comprise a ceramic monolithic substrate. The substrate may vary in its material composition, size and configuration, cell shape and density, and wall thickness. Suitable substrates are known in the art.

Disposing the loaded support material on a substrate may be carried out using techniques known in the art. Typically, the loaded support material is disposed on the substrate by pouring a slurry of the loaded support material into the inlet of the substrate using a specific moulding tool in a predetermined amount. As discussed in more detail below, subsequent vacuum and drying steps may be employed during the disposition step. When the support is a filter block, the loaded support material may be disposed on the filter walls, within the filter walls (if porous) or both.

Heating the loaded support material is typically carried out in an oven or furnace, more typically a belt or static oven or furnace, typically in hot air at a specific flow from one direction. The heating may comprise calcination. The heating may also comprise drying. The drying and calcination steps may be continuous or sequential. For example, a separate washcoat may be applied after the substrate is already washcoated and dried with a previous washcoat. A washcoated substrate can also be dried and calcined using one continuous heating program if coating is completed. During the heating, the complex may at least partially, substantially or completely decompose. In other words, the ligands of the complex, i.e. the polyamine, are at least partially, substantially or completely removed or separated from the PGM, and are removed from the final catalyst article. Particles of such separated PGMs may then begin to form metal-metal and metal-oxide bonds. As a result of the heating (calcination), the substrate is typically substantially free of polyamine, more typically completely free of polyamine.

The term "nanoparticle" as used herein may encompass a particle having a diameter of from 0.01 nm to 100 nm as measured by TEM. The nanoparticles may be in any shape, e.g. a sphere, a plate, cubic, cylindrical, hexagonal or a rod, but are typically spherical. The largest dimension of the nanoparticle (i.e. the diameter if the nanoparticle is spherical), will typically be from 0.5 to 10 nm, more typically from 1 to 5 nm, as measured by TEM.

Following the heating step, the substrate is typically cooled, more typically to room temperature. The cooling is typically carried out in air with or without cooling agent/media, typically without cooling agent.

The polyamine preferably comprises polyethyleneimine. The term "polyethyleneimine" as used herein may encompass a polymer with repeating units composed of an amine group and a two carbon aliphatic $CH_2CH_2$ spacer. In other words, polyethyleneimine may have the following general formula:

Polyethyleneimine is sometimes referred to as polyaziridine or poly[imino(1,2-ethanediyl)], and has the IUPAC formula poly(iminoethylene). The polyethyleneimine used in the method of the present invention may be linear or branched, but is preferably branched. The polyethyleneimine may be in dendrimeric form. The use of polyethyleneimine may result in particularly favourable perturbated light-off performance.

The polyamine preferably has a weight average molecular weight $M_w$ of from 100 to 1,000,000, more preferably from 600 to 800,000 g/mol measured by light scattering. The weight average molecular weight Mw is determined by the formula:

$$\overline{M}_w = \frac{\sum_i N_i M_i^2}{\sum_i N_i M_i}$$

where $N_i$ is the number of molecules of molecular mass $M_i$. The use of such weight average molecular weights may result in particularly favourable perturbated light-off performance.

The polyamine preferably has a number average molecular weight $M_n$ of from 400 to 70,000 g/mol measured by gel permeation chromatography (GPC). The number average molecular weight $M_w$ is determined by the formula:

$$\overline{M}_n = \frac{\sum_i N_i M_i}{\sum_i N_i}$$

where again $N_i$ is the number of molecules of molecular mass $M_i$. The use of such number average molecular weights may result in particularly favourable perturbated light-off performance.

The PGM is preferably selected from one or more of rhodium, palladium and platinum. Such metals may be particularly suitable for carrying out three-way catalysis. In addition, such metals are expensive meaning that it would be advantageous to be able to provide similar levels of catalytic activity for the same amount of metal. Furthermore, the use of such metals in the method of the present invention may result in particularly favourable perturbated light-off performance.

The PGM more preferably comprises rhodium. Rhodium is a particularly expensive PGM.

In a preferred embodiment, the PGM comprises rhodium and palladium. In another preferred embodiment, the PGM comprises rhodium and platinum. The use of such metals in the method of the present invention may result in particularly favourable perturbated light-off performance.

The support material preferably comprises an oxide, preferably one or more of $Al_2O_3$ (aluminum oxide or alumina), $SiO_2$, $TiO_2$, $CeO_2$, $ZrO_2$, $V_2O_5$, $La_2O_3$ and zeolites. The oxide is preferably a metal oxide. The support material more preferably comprises alumina, even more preferably gamma-alumina. The support material preferably comprises ceria-zirconia. The support material preferably comprises alumina and ceria-zirconia. The alumina and/or ceria-zirconia is preferably doped, more preferably with an oxide of one or more of lanthanum, neodymium, yttrium, niobium, praseodymium, hafnium, molybdenum, titanium, vanadium, zinc, cadmium, manganese, iron, copper, calcium, barium, strontium, caesium, magnesium, potassium, or sodium; even more preferably with an oxide of lanthanum, neodymium or yttrium. Such doped oxides are particularly effective as support materials. Preferably, the dopant is present in the alumina and/or ceria-zirconia in an amount of from 0.001 wt. % to 20 wt. %, and more preferably from 0.5 wt. % to 10 wt. %.

The support material is preferably in the form of a powder having a D90 of from 0.1 to 25 µm, more preferably from 0.5 to 5 µm.

The loaded support material is preferably disposed onto the substrate in the form of a slurry. A slurry is particularly effective at disposing a material onto a substrate, in particular for maximized gas diffusion and minimized pressure drop during catalytic conversion.

Providing the complex of a polyamine and a PGM preferably comprises synthesising the complex in situ in the slurry.

The slurry is preferably prepared by a method comprising:
  contacting a PGM salt and a polyamine in water to form the complex of a polyamine and a PGM in an aqueous solution; and
  applying the complex to the support material to form a loaded support material by contacting the support material with the aqueous solution;
  optionally adding one or more of an oxygen storage material, preferably ceria-zirconia; a promoter salt; a binder; an acid or a base; a thickening agent; and a reducing agent to the aqueous solution.

Such a "one-pot" preparation method may be simplified and lower cost in comparison to conventional methods. It may also maximize utilization of the polymers.

In other words, the steps of providing a complex of a polyamine and a PGM; providing a support material; applying the complex to the support material to form a loaded support material; and disposing the loaded support material on a substrate may comprise:
  contacting a PGM salt and a polyamine in water to form the complex of a polyamine and a PGM in an aqueous solution;
  adding the support material to the aqueous solution to form a slurry of loaded support material;
  optionally adding one or more of an oxygen storage material, preferably ceria-zirconia; a promoter salt; a binder; an acid or a base; a thickening agent; and a reducing agent to the slurry; and
  disposing the slurry on the substrate.

The loading may comprise washcoating.

The slurry preferably has a solids content of from 10 to 40%, preferably from 15 to 35%. Such a solids content may enable slurry rheologies suitable for disposing the loaded support material onto the substrate. For example, if the substrate is a honeycomb monolith, such solid contents may enable the deposition of a thin layer of washcoat onto the inner walls of the substrate. If the substrate is a wall flow filter, such solids contents may enable the slurry to enter the channels of the wall flow filter and may enable the slurry to enter the walls of the wall flow filter.

Preferably, the slurry further comprises one or more of:
  an oxygen storage material, preferably ceria-zirconia;
  a promoter salt;
  a binder;
  an acid or a base;
  a thickening agent; and
  a reducing agent.

Promotors may include, for example, a non-PGM transition metal element, a rare earth element, an alkali group element, and/or a combination of two or more of the above elements within the same or different groups in periodic table. The promotor salt may be a salt of such elements.

Binders may include, for example, an oxide material with small particle size to bind the individual insoluble particles together in washcoat slurry. The use of binders in washcoats is well known in the art.

Thickening agents may include, for example, a natural polymer with functional hydroxyl groups that interacts with insoluble particles in washcoat slurry. It serves the purpose of thickening washcoat slurry for the improvement of coating profile during washcoat coating onto substrate. It is usually burned off during washcoat calcination. Examples of specific thickening agents/rheology modifiers for washcoats include glactomanna gum, guar gum, xanthan gum, curdlan schizophyllan, scleroglucan, diutan gum, Whelan gum, hydroxymethyl cellulose, carboxymethyl cellulose, hydroxyethyl cellulose, methyl cellulose, methyl hydroxyethyl cellulose, methyl hydroxypropyl cellulose and ethyl hydroxycellulose.

The term "reducing agent" as described herein may encompass a compound that can reduce the PGM cations to particles in its metallic state in situ during washcoat preparation.

An organic acid can be added that acts as a reductant for PGM and/or creates a reducing environment during the later heating/calcinating step. Examples of a suitable organic acid may include citric acid, succinic acid, oxalic acid, ascorbic acid, acetic acid, formic acid, tannic acid, and combinations thereof.

In a preferred embodiment, the PGM comprises rhodium, the support material comprises alumina and the slurry further comprises ceria-zirconia. In another preferred embodiment, the PGM comprises rhodium, the support material comprises ceria-zirconia and the slurry further comprises alumina. In another preferred embodiment, the PGM comprises rhodium and the support material comprises alumina and ceria-zirconia.

The method preferably further comprises disposing a further slurry on the substrate, the further slurry comprising one or more of a further support material; an oxygen storage material; a promoter salt; a binder; an acid or a base; a thickening agent; and a reducing agent, wherein disposing the further slurry on the substrate takes place before disposing the support material on the substrate and/or after heating the loaded support material to form nanoparticles of the PGM on the support material. This may result in a catalyst article having multiple layers of different washcoats, for example a bottom washcoat containing, inter alia, rhodium nanoparticles supported on alumina, and a top washcoat containing, inter alia, rhodium nanoparticles supported on alumina. Further examples of such multiple layers are discussed in more detail below.

Disposing the loaded support material on a substrate preferably comprises contacting the slurry with the substrate (e.g. pouring the slurry into an inlet of the substrate) and optionally:
applying a vacuum to the substrate, and/or
drying the slurry on the substrate.

This may result in a favourable distribution of the loaded support material on the substrate.

The drying preferably occurs:
at a temperature of from 60° C. to 200° C., more preferably from 70° C. to 130° C.; and/or
for from 10 to 360 minutes, preferably from 15 to 60 minutes.

The substrate may be a "blank", i.e. un-washcoated, substrate. Alternatively, the substrate may have one or washcoats already loaded thereon. In such a situation, the final catalyst article may comprise multiple layers of different washcoats.

The substrate preferably comprises cordierite. Cordierite substrates are particularly suitable for use in catalyst articles.

The substrate is preferably in the form of a honeycomb monolith, a wall flow filter or a flow through filter.

The heating is preferably carried out:
at a temperature of from 400° C. to 700° C., preferably from 400° C. to 600° C., more preferably from 450° C. to 600° C.; and/or
for from 10 to 360 minutes, preferably from 35 to 120 minutes.

Lower temperatures and/or shorter heating times may result in insufficient decomposition of the complex and/or may result in high levels of polyamine remaining in the substrate. Higher temperatures and/or longer heating times may lead to the particles of PGM having an unfavourably large particle size, presumably due to sintering. Higher temperatures and longer heating times may also lead to damage to the catalyst article.

The heating preferably comprises calcining. The term "calcining" as used herein may encompass a thermal treatment process in the absence of, or limited supply of, air or oxygen to bring about a thermal decomposition.

The nanoparticles preferably have a D50 of from 0.1 nm to 10 nm, more preferably from 0.2 to 5 nm, even more preferably from 0.2 to 4 nm. The D50 may be measured by TEM. Such particle sizes may result in a favourable level of catalytic activity.

In a further aspect, the present invention provides a catalyst article obtainable by the method described herein, the catalyst article for use in an emission treatment system.

In comparison to conventional catalyst article, the catalyst article obtainable by the method described herein may contain PGM particles having favourably small particle sizes and a favourable particle size distribution (e.g. a D50 of from 0.2 to 4 nm). In addition, in comparison to conventional catalyst articles, the catalyst article obtainable by the method described herein may exhibit a more uniformed dispersion of PGM particles throughout the substrate.

When used in an emission treatment system, the catalyst article may exhibit favourable light-off performance, in particular for NO, CO and total hydrocarbons during three-way catalytic conversions for stoichiometric gasoline emissions abatement.

The catalyst is preferably for three-way catalysis.

The catalyst article may have a washcoat loading of from 1 $g/in^3$ to 3 $g/in^3$. Such a catalyst article may exhibit similar or higher catalytic activity in comparison to conventional catalyst articles but may be lower cost in view of the lower levels of PGM employed.

The substrate preferably comprises a wall flow filter substrate or a flow-through substrate.

In a preferred embodiment, the catalyst article comprises a bottom layer of support material having rhodium thereon and a top layer of support material having palladium thereon. In another preferred embodiment, the catalyst article comprises a bottom layer of support material having palladium thereon and a top layer of support material having rhodium thereon. The term "bottom layer" as used herein may encompass a layer (e.g. washcoat layer) that is closest to or in contact with the substrate (i.e. substrate walls). The term "top layer" as used herein may encompass a layer (e.g. a washcoat layer) that is more remote from the substrate (i.e. substrate walls) than the bottom layer, and may be situated on top of the bottom layer.

In such preferred embodiments, the support material preferably comprises alumina and ceria-zirconia.

The catalyst article, in particular in such preferred embodiments, preferably comprises from 2 $g/ft^3$ to 15 $g/ft^3$ rhodium, more preferably from 5 $g/ft^3$ to 10 $g/ft^3$ rhodium. Advantageously, such rhodium levels may be lower than those of conventional catalyst articles but without compromising catalytic activity.

The catalyst article, in particular in such preferred embodiments, preferably comprises from 50 $g/ft^3$ to 200 $g/ft^3$ palladium, more preferably from 80 $g/ft^3$ to 150 $g/ft^3$ palladium. Advantageously, such palladium levels may be lower than those of conventional catalyst articles but without compromising catalytic activity.

In a preferred embodiment, the loaded support material is disposed on the substrate in the form of a slurry, the PGM comprises rhodium, the support material comprises alumina and the slurry further comprises ceria-zirconia. In another preferred embodiment, the loaded support material is disposed on the substrate in the form of a slurry, the PGM comprises rhodium, the support material comprises ceria-zirconia and the slurry further comprises alumina. In another preferred embodiment, the loaded support material is disposed on the substrate in the form of a slurry, the PGM comprises rhodium and the support material comprises alumina and ceria-zirconia.

In a further aspect, the present invention provides an emission treatment system comprising the catalyst article described herein.

The emission treatment system is preferably for a gasoline engine.

The gasoline engine preferably operates under stoichiometric conditions.

In a further aspect, the present invention provides a method of treating an exhaust gas, the method comprising:
providing the catalyst article described herein; and
contacting the catalyst article with an exhaust gas.

The exhaust gas is preferably an exhaust gas from a gasoline engine. The catalyst article is particularly suitable for treating such exhaust gas. The gasoline engine preferably operates under stoichiometric conditions.

The invention will now be described in relation to the following non-limiting examples.

Polyethyleneimines

The following polyethyleneimines, labelled PEI-a to PEI-e, were purchased from various vendors:
PEI-a: Polyethyleneimine branched, average Mw~800 by LS, average Mn~600 by GPC (CAS no. 25987-06-8).
PEI-b: Poly(ethyleneimine) solution, average Mn~1,200, average Mw~1300 by LS, 50 wt. % in $H_2O$ (CAS no. 9002-98-6).
PEI-c: Poly(ethyleneimine) solution, average Mn~1,800 by GPC, average Mw~2,000 by LS, 50 wt. % in $H_2O$ (CAS no. 25987-06-8).
PEI-d: Polyethyleneimine branched, average Mw~25,000 by LS, average Mn~10,000 by GPC, branched (CAS no. 9002-98-6).
PEI-e: Poly(ethyleneimine) solution, average Mn~60,000 by GPC, average Mw~750,000 by LS, 50 wt. % in $H_2O$ (CAS no. 9002-98-6).

Manufacture of Catalyst Articles

A number of catalyst articles were prepared according to the following examples.

Reference Example 1: 0.3% Rh/Gamma Alumina Washcoated Catalyst

A catalyst article was prepared carrying by out the following steps:
1. Add required amount of rhodium nitrate (Rh loading 5.2 g/ft$^3$) and water to dissolve, mix for 1 hr.
2. Add milled gamma alumina (1 g/in$^3$) slurry, mix for 1 hr.
3. Add DI water to adjust solids to ~20%.
4. Add activated 4 wt % thickening agent in water to adjust batch solid to 30%. Mix vigorously with VWR vortex mixer until a homogeneous gel form.
5. Coat 1×3 inch cores targeting 1.2 inch does from inlet under vacuum pull, dry with air cure.
6. Fire the brick at 500° C. for 30 min in a static oven Example 2: 0.3% Rh/Gamma Alumina (with Rh Modified by PEI-a) Washcoated Catalyst A catalyst article was prepared carrying by out the following steps:
1. Add required amount of rhodium nitrate (Rh loading 5.2 g/ft$^3$) and water to dissolve, mix for 1 hr.
2. Add the required amount of PEI-a, targeting PEI-a: Rh mass ratio of 2.6. Mix for 1 hr.
3. Add milled gamma alumina slurry, mix for 1 hr.
4. Add DI water to adjust solids to ~20%.
5. Add activated 4 wt % thickening agent (1 g/in$^3$) in water to adjust batch solid to 30%. Mix vigorously with VWR vortex mixer until a homogeneous gel form.
6. Coat 1×3 inch cores targeting 1.2 inch does from inlet under vacuum pull, dry with air cure.
7. Fire the brick at 500° C. for 30 min in a static oven.

Example 3: 0.3% Rh/Gamma Alumina (with Rh Modified by PEI-b) Washcoated Catalyst A catalyst article was prepared carrying by out the following steps:
1. Add required amount of rhodium nitrate (Rh loading 5.2 g/ft$^3$) and water to dissolve, mix for 1 hr.
2. Add the required amount of PEI-b, targeting PEI-b: Rh mass ratio of 2.9. Mix for 1 hr.
3. Add milled gamma alumina slurry, mix for 1 hr.
4. Add DI water to adjust solids to −20%.
5. Add activated 4 wt % thickening agent (1 g/in$^3$) in water to adjust batch solid to 30%. Mix vigorously with VWR vortex mixer until a homogeneous gel form.
6. Coat 1×3 inch cores targeting 1.2 inch does from inlet under vacuum pull, dry with air cure.
7. Fire the brick at 500° C. for 30 min in a static oven Example 4: 0.3% Rh/Gamma Alumina (with Rh Modified by PEI-c) Washcoated Catalyst A catalyst article was prepared carrying by out the following steps:
1. Add required amount of rhodium nitrate (Rh loading 5.2 g/ft$^3$) and water to dissolve, mix for 1 hr.
2. Add the required amount of PEI-c, targeting PEI-c: Rh mass ratio of 2.8. Mix for 1 hr.
3. Add milled gamma alumina slurry, mix for 1 hr.
4. Add DI water to adjust solids to ~20%.
5. Add activated 4 wt % thickening agent (1 g/in$^3$) in water to adjust batch solid to 30%.
Mix vigorously with VWR vortex mixer until a homogeneous gel form.
6. Coat 1×3 inch cores targeting 1.2 inch does from inlet under vacuum pull, dry with air cure.
7. Fire the brick at 500° C. for 30 min in a static oven Example 5: 0.3% Rh/Gamma Alumina (with Rh Modified by PEI-d) Washcoated Catalyst A catalyst article was prepared carrying by out the following steps:
1. Add required amount of rhodium nitrate (Rh loading 5.2 g/ft$^3$) and water to dissolve, mix for 1 hr.
2. Add the required amount of PEI-d, targeting PEI-d: Rh mass ratio of 2.5. Mix for 1 hr.
3. Add milled gamma alumina slurry, mix for 1 hr.
4. Add DI water to adjust solids to ~20%.

5. Add activated 4 wt thickening agent (1 g/in$^3$) in water to adjust batch solid to 30%. Mix vigorously with VWR vortex mixer until a homogeneous gel form.
6. Coat 1×3 inch cores targeting 1.2 inch does from inlet under vacuum pull, dry with air cure.
7. Fire the brick at 500° C. for 30 min in a static oven Example 6: 0.3% Rh/Gamma Alumina (with Rh Modified by PEI-e) Washcoated Catalyst A catalyst article was prepared carrying by out the following steps:
1. Add required amount of rhodium nitrate (Rh loading 5.2 g/ft$^3$) and water to dissolve, mix for 1 hr.
2. Add the required amount of PEI-e, targeting PEI-e: Rh mass ratio of 2.5. Mix for 1 hr.
3. Add milled gamma alumina slurry, mix for 1 hr.
4. Add DI water to adjust solids to ~20%.
5. Add activated 4 wt % thickening agent (1 g/in$^3$) in water to adjust batch solid to 30%. Mix vigorously with VWR vortex mixer until a homogeneous gel form.
6. Coat 1×3 inch cores targeting 1.2 inch does from inlet under vacuum pull, dry with air cure.
7. Fire the brick at 500° C. for 30 min in a static oven Reference Example 7: Rh-TWC Washcoated Catalyst A catalyst article was prepared carrying by out the following steps:
1. Prepare a slurry of milled gamma alumina support (0.6 g/in$^3$).
2. Add appropriate amount of rhodium nitrate solution (Rh loading 4.8 g/ft$^3$) and mix until homogeneous.
3. Add ammonium dropwise until pH 7.0-7.5 is reached. Washcoat will thicken upon ammonium addition.
4. Mix for 15-20 minutes so the Rhodium is precipitate throughout the washcoat.
5. Add Ceria-Zirconia support (0.65 g/in$^3$) and mix for 30 minutes until homogeneous.
6. Add binder material (0.03 g/in$^3$) and mix for 30 minutes.
7. Add DI water to adjust solids to ~23%.
8. Add thickening agent targeting ~1.0-1.2 wt % water based. Mix for at least 6 hours.
9. Coat cordierite substate with 1.2 inch single dose washcoat from inlet under vacuum pull, dry with air cure.
10. Fire the washcoated brick at 500° C. for 30 min in a static oven.

Example 8: Rh-TWC (with Rh Modified by PEI-a) Washcoated Catalyst

A catalyst article was prepared carrying by out the following steps:
1. Prepare a slurry of RhN (Rh loading 4.8 g/ft$^3$).
2. Add the required amount of PEI-a, targeting PEI-a: Rh mass ratio of 2.6. Mix for 1 hr.
3. Add milled gamma alumina support (0.6 g/in$^3$) slurry, mix for 1 hr.
4. Add Ceria-Zirconia support (0.65 g/in$^3$), mix for 30 min.
5. Add binder material (0.03 g/in$^3$), mix for 30 min.
6. Add DI water to adjust solids to ~23%.
7. Add thickening agent targeting ~1.0-1.2 wt % water based. Mix for at least 6 hours.
8. Coat cordierite substate with 1.2 inch single dose washcoat from inlet under vacuum pull, dry with air cure.
9. Fire the washcoated brick at 500° C. for 30 min in a static oven.

Example 9: Rh-TWC (with Rh Modified by PEI-b) Washcoated Catalyst

A catalyst article was prepared carrying by out the following steps:
1. Prepare a slurry of RhN (Rh loading 4.8 g/ft$^3$).
2. Add the required amount of PEI-b, targeting PEI-b: Rh mass ratio of 2.9. Mix for 1 hr.
3. Add milled gamma alumina support (0.6 g/in$^3$) slurry, mix for 1 hr.
4. Add Ceria-Zirconia support (0.65 g/in$^3$), mix for 30 min.
5. Add binder material (0.03 g/in$^3$), mix for 30 min.
6. Add DI water to adjust solids to ~23%.
7. Add thickening agent targeting ~1.0-1.2 wt % water based. Mix for at least 6 hours.
8. Coat cordierite substate with 1.2 inch single dose washcoat from inlet under vacuum pull, dry with air cure.
9. Fire the washcoated brick at 500° C. for 30 min in a static oven.

Example 10: Rh-TWC (with Rh Modified by PEI-c) Washcoated Catalyst

A catalyst article was prepared carrying by out the following steps:
1. Prepare a slurry of RhN (Rh loading 4.8 g/ft$^3$).
2. Add the required amount of PEI-c, targeting PEI-c: Rh mass ratio of 2.8. Mix for 1 hr.
3. Add milled gamma alumina support (0.6 g/in$^3$) slurry, mix for 1 hr.
4. Add Ceria-Zirconia support (0.65 g/in$^3$), mix for 30 min.
5. Add binder material (0.03 g/in$^3$), mix for 30 min.
6. Add DI water to adjust solids to ~23%.
7. Add thickening agent targeting ~1.0-1.2 wt % water based. Mix for at least 6 hours.
8. Coat cordierite substate with 1.2 inch single dose washcoat from inlet under vacuum pull, dry with air cure.
9. Fire the washcoated brick at 500° C. for 30 min in a static oven.

Example 11: Rh-TWC (with Rh Modified by PEI-d) Washcoated Catalyst

A catalyst article was prepared carrying by out the following steps:
1. Prepare a slurry of RhN (Rh loading 4.8 g/ft$^3$).
2. Add the required amount of PEI-d, targeting PEI-d: Rh mass ratio of 2.5. Mix for 1 hr.
3. Add milled gamma alumina support (0.6 g/in$^3$) slurry, mix for 1 hr.
4. Add Ceria-Zirconia support (0.65 g/in$^3$), mix for 30 min.
5. Add binder material (0.03 g/in$^3$), mix for 30 min.
6. Add DI water to adjust solids to ~23%.
7. Add thickening agent targeting ~1.0-1.2 wt % water based. Mix for at least 6 hours.

8. Coat cordierite substate with 1.2 inch single dose washcoat from inlet under vacuum pull, dry with air cure.
9. Fire the washcoated brick at 500° C. for 30 min in a static oven.

Example 12: Rh-TWC (with Rh Modified by PEI-e) Washcoated Catalyst

A catalyst article was prepared carrying by out the following steps:
1. Prepare a slurry of RhN (Rh loading 4.8 g/ft$^3$).
2. Add the required amount of PEI-e, targeting PEI-e: Rh mass ratio of 2.5. Mix for 1 hr.
3. Add milled gamma alumina support (0.6 g/in$^3$) slurry, mix for 1 hr.
4. Add Ceria-Zirconia support (0.65 g/in$^3$), mix for 30 min.
5. Add binder material (0.03 g/in$^3$), mix for 30 min.
6. Add DI water to adjust solids to ~23%.
7. Add thickening agent targeting ~1.0-1.2 wt % water based. Mix for at least 6 hours.
8. Coat cordierite substate with 1.2 inch single dose washcoat from inlet under vacuum pull, dry with air cure.
9. Fire the washcoated brick at 500° C. for 30 min in a static oven.

Reference Example 13: 0.3% Pt/Gamma Alumina Washcoated Catalyst

A catalyst article was prepared carrying by out the following steps:
1. Add required amount of platinum nitrate (Pt loading 5.2 g/ft$^3$) and water to dissolve, mix for 1 hr.
2. Add milled gamma alumina (1 g/in$^3$) slurry, mix for 1 hr.
3. Add DI water to adjust solids to ~20%.
4. Add activated 4 wt % thickening agent in water to adjust batch solid to 30%. Mix vigorously with VWR vortex mixer until a homogeneous gel form.
5. Coat 1×3 inch cores targeting 1.2 inch does from inlet under vacuum pull, dry with air cure.
6. Fire the brick at 500° C. for 30 min in a static oven Example 14: 0.3% Pt/Gamma Alumina (with Pt Modified by PEI-a) Washcoated Catalyst A catalyst article was prepared carrying by out the following steps:
1. Add required amount of platinum nitrate (Pt loading 5.2 g/ft$^3$) and water to dissolve, mix for 1 hr.
2. Add the required amount of PEI-a, targeting PEI-a: Pt mass ratio of 0.9. Mix for 1 hr.
3. Add milled gamma alumina slurry, mix for 1 hr.
4. Add DI water to adjust solids to ~20%.
5. Add activated 4 wt % thickening agent (1 g/in$^3$) in water to adjust batch solid to 30%. Mix vigorously with VWR vortex mixer until a homogeneous gel form.
6. Coat 1×3 inch cores targeting 1.2 inch does from inlet under vacuum pull, dry with air cure.
7. Fire the brick at 500° C. for 30 min in a static oven.

Examples 15-18: 0.3% Pt/Gamma Alumina (Modified by PEI-b, PEI-c, PEI-d and PEI-e, Respectively) Washcoated Catalysts The catalyst articles were prepared in a similar manner to Example 14 but with the use of PEI-b, PEI-c, PEI-d and PEI-e, respectively, instead of PEI-a.

Reference Example 19: Rh—Pt Bimetallic TWC Washcoated Catalyst

A catalyst article was prepared carrying by out the following steps:
1. Prepare Ceria-Zirconia support (1.1 g/in$^3$) slurry, add at least 50% of planned water.
2. Add Rh nitrate (Rh loading 3.6 g/ft$^3$) to the above Ceria-Zirconia slurry, mix for at least 15 min.
3. Adjust pH to >6 with ammonia; mix for at least 1 hour.
4. Add gamma alumina (0.4 g/in$^3$) slurry and Platinum nitrate (Pt loading 1.8 g/ft$^3$), mix for at least 15 min.
5. Adjust pH to >5.8 with ammonia; mix for at least 30 min.
6. Add binder (0.03 g/in$^3$), mix for at least 30 min.
7. Adjust washcoat to target solid % (suggest ~25%), add thickening agent (suggest ~0.8-1.0%). Mix overnight
8. Coat 50-55% from inlet under vacuum, dry with air cure, then coat 50-55% DL from outlet.
9. Fire the brick at 500° C./30 in a static oven.

Example 20: Rh-Pt Bimetallic TWC (Modified by PEI-a) Washcoated Catalyst

A catalyst article was prepared carrying by out the following steps:
1. Make a solution of required amount of PEI-a in water, targeting PEI-a: (Rh+Pt) mass ratio of 3.5.
2. Add Rh nitrate (Rh loading 3.6 g/ft$^3$), mix for 1 hr.
3. Add Ceria-Zirconia support (1.1 g/in$^3$) slurry, mix for at least 1 hour.
4. Add gamma alumina (0.4 g/in$^3$) slurry and Platinum nitrate (Pt loading 1.8 g/ft$^3$), mix for at least 15 min.
5. Add binder (0.03 g/in$^3$), mix for at least 30 min.
6. Adjust washcoat to target solid % (suggest ~25%), add thickening agent (suggest ~0.8-1.0%). Mix overnight
7. Coat 50-55% from inlet under vacuum, dry with air cure, then coat 50-55% DL from outlet.
8. Fire the brick at 500° C./30 in a static oven.

Examples 21-24: Rh—Pt Bimetallic TWC (Modified by PEI-b, PEI-c, PEI-d and PEI-e, Respectively) Washcoated Catalysts The catalyst articles were prepared in a similar manner to Example 20 but with the use of PEI-b, PEI-c, PEI-d and PEI-e, respectively, instead of PEI-a.

STEM Elemental Mapping

Figure 1A:
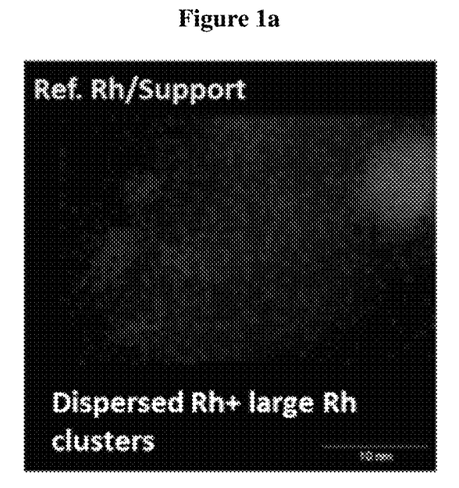
FIG. 1a shows results of STEM elemental mapping of fresh catalyst article of Reference Example 1.
Figure 1B:
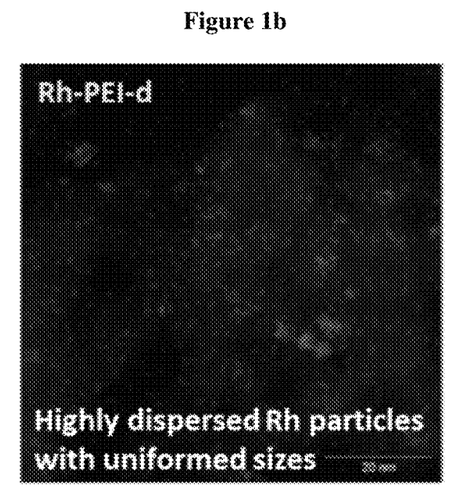
FIG. 1b shows results of STEM elemental mapping of fresh catalyst article of Example 5 manufactured according to method of the present invention.
Figure 1C:
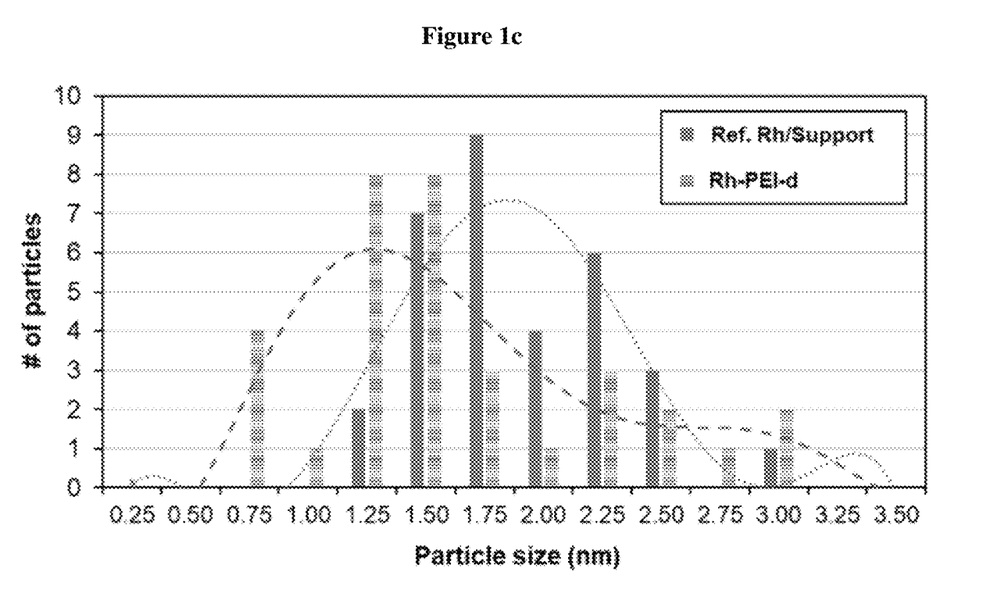
FIG. 1c shows Rh particle size and distribution between Reference Example 1 and Example 5.

STEM elemental mapping of Rh particles was carried out on the fresh catalyst article of Example 5 and the fresh catalyst article of Reference Example 1. The results are shown in FIGS. 1a-1c. In comparison to the catalyst article of Reference Example 1 (as shown in FIG. 1a), the catalyst article of Example 5 (FIG. 1b) exhibited reduced fresh Rh particle size (increased Rh dispersion) and more uniformed size distribution (FIG. 1c).

Ethane Hydrogenolysis Tests

Figure 2:
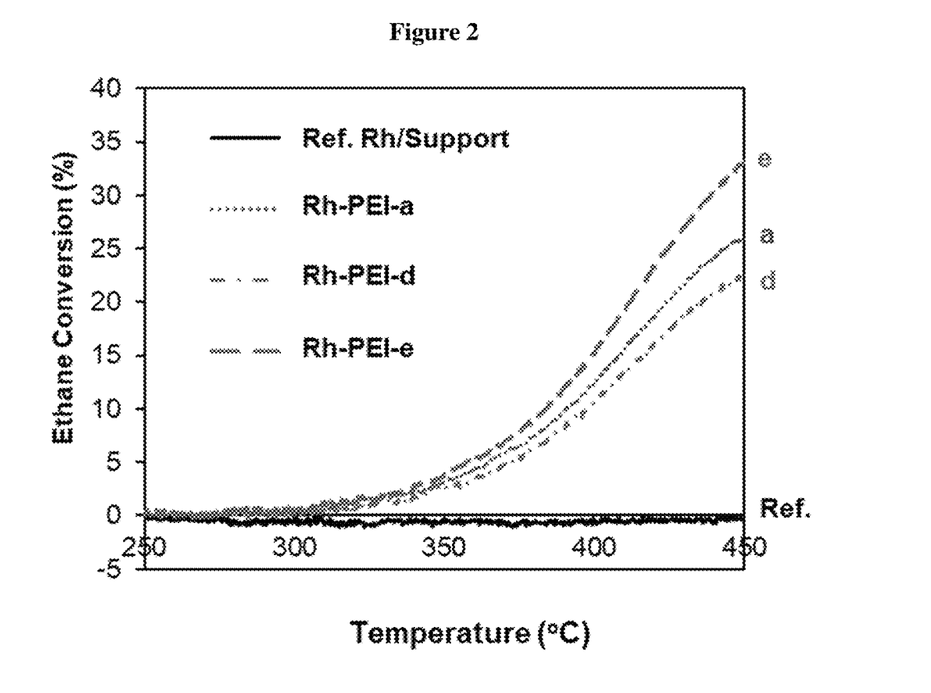
FIG. 2 shows results of ethane hydrogenolysis tests of Example catalyst articles manufactured according to method of the present invention and a Reference Example catalyst article.

The catalysts articles of Examples 2, 5 and 6 and Reference Example 1 were aged and subjected to enthane hydrogenolysis tests. (Aging condition: 1000° C./Redox/40 hrs. Reaction condition: with degas pre-treatment, 0.5% $C_2H_6$ and 2.8% $H_2$ balanced with $N_2$.) The results are shown in FIG. 2, and enable qualitative comparison of Rh active metal surface area. In comparison to the catalyst article of Reference Example 1, the catalyst articles of Examples 2, 5 and 6 exhibited higher Rh active metal surface area after aging, indicating higher Rh stability towards aging at relevant conditions.

Perturbated Light-Off Performance

Figure 3A:
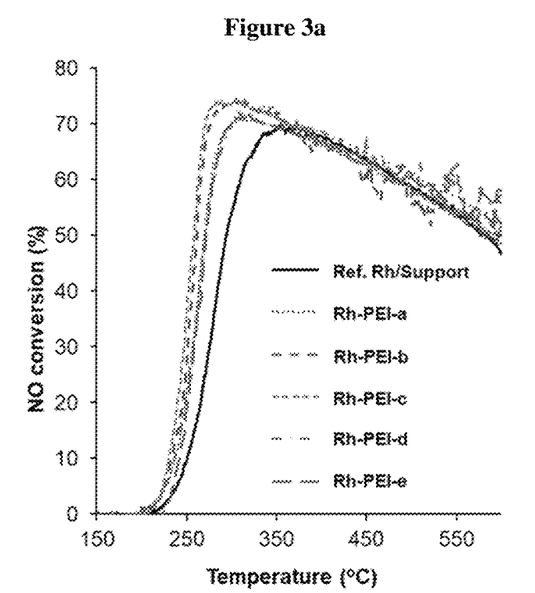
FIG. 3a shows NO conversion results of perturbated light-off performance testing of Example catalyst articles manufactured according to method of the present invention and a Reference Example catalyst article.
Figure 3B:
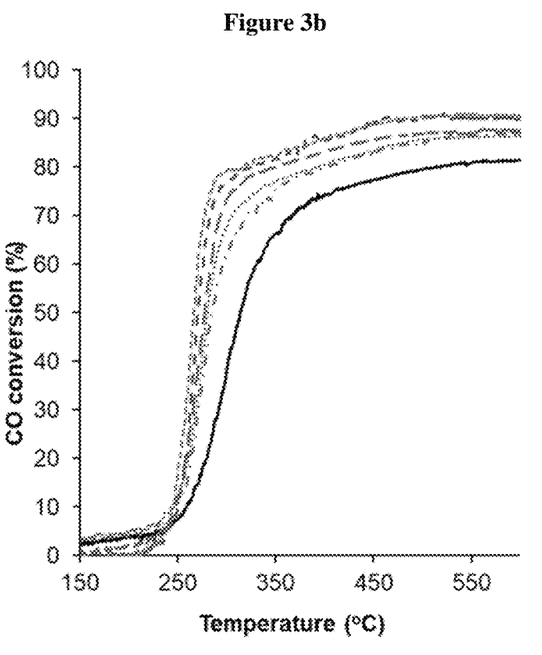
FIG. 3b shows CO conversion results of perturbated light-off performance testing of Example catalyst articles manufactured according to method of the present invention and a Reference Example catalyst article.
Figure 3C:
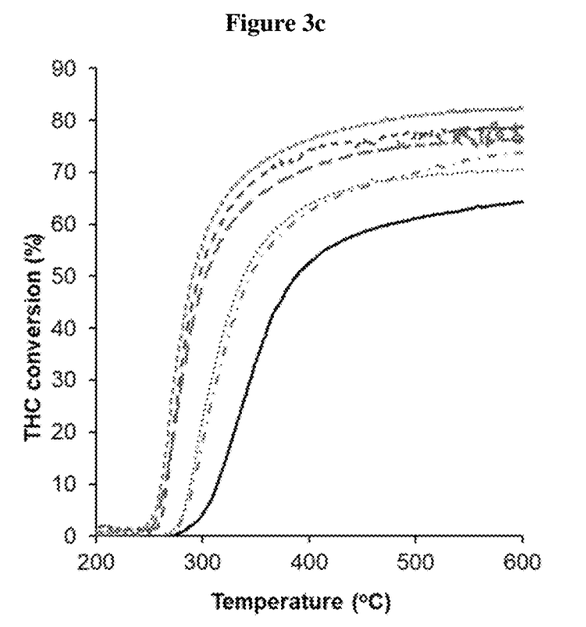
FIG. 3c shows THC conversion results of perturbated light-off performance testing of Example catalyst articles manufactured according to method of the present invention and a Reference Example catalyst article.

After aging, the single supported catalyst articles of Examples 2-6 and Reference Example 1 were tested for perturbated light-off performance for TWC conversions. (Aging condition: 1000° C./Redox/40 hr. Reaction condition: with rich pre-treatment, 150-700° C., $\lambda$=0.96~1.04, GHSV=200,000 $hr^{-1}$.) The results are shown in FIGS. 3a-3c for NO, CO, and THC conversions. The TWC activity follows an order of Rh-PEI-c>b>e>a>d>Ref. Rh/single support. The maximum $T_{50}$ reductions for $NO_x$, CO, and THC for single supported Rh systems by PEI modifications were respectively 36° C., 48° C., and 98° C.

Figure 4A:
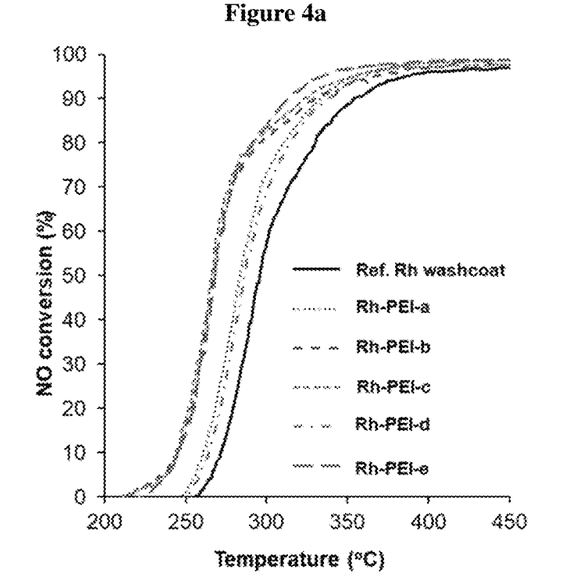
FIG. 4a shows NO conversion results of perturbated light-off performance testing of Example catalyst articles manufactured according to method of the present invention and a Reference Example catalyst article.
Figure 4B:
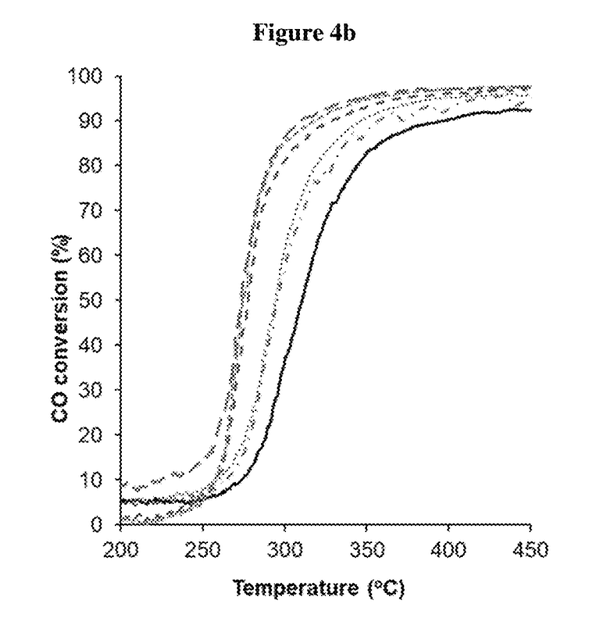
FIG. 4b shows CO conversion results of perturbated light-off performance testing of Example catalyst articles manufactured according to method of the present invention and a Reference Example catalyst article.
Figure 4C:
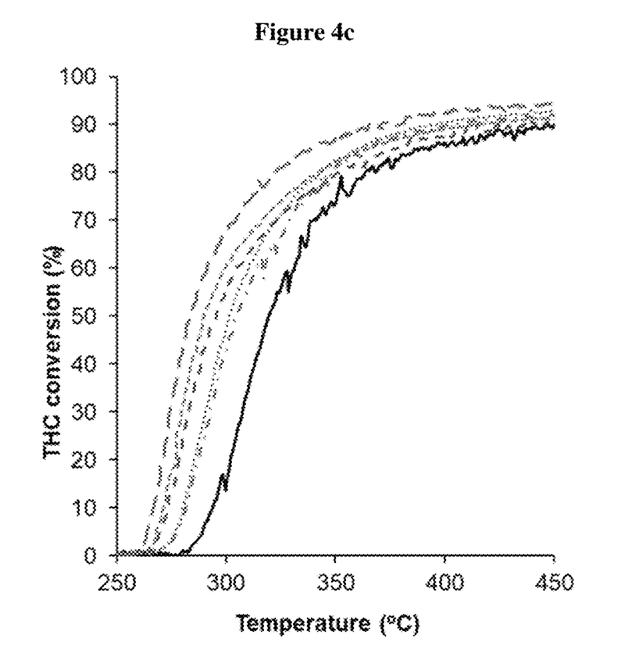
FIG. 4c shows THC conversion results of perturbated light-off performance testing of Example catalyst articles manufactured according to method of the present invention and a Reference Example catalyst article.

Similar improvements were observed in more complexed formulated Rh catalysts (Examples 8-12 and Reference Example 7), with the results shown in FIGS. 4a-4c for NO, CO, and THC conversions. (Aging condition: 1000° C./Redox/40 hr. Reaction condition: with rich pre-treatment, 150-700° C., $\lambda$=0.96~1.04, GHSV=200,000 $hr^{-1}$.) The TWC activity follows an order of Rh-PEI-e >b>a>d>r>Ref. Rh formulated catalyst. The maximum Tso reductions for $NO_N$, CO, and THC were respectively 27° C., 36° C., and 36° C.

Figure 5A:
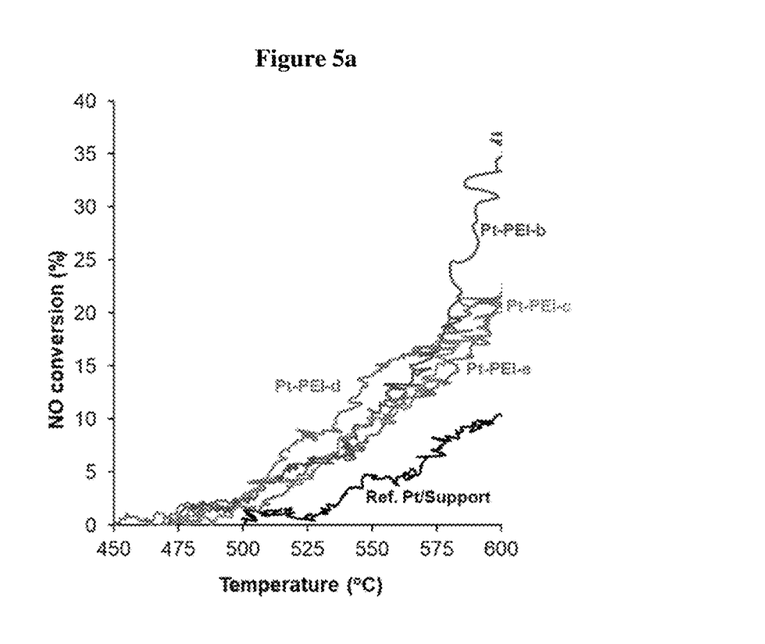
FIG. 5a shows NO conversion results of perturbated light-off performance testing of Example catalyst articles manufactured according to method of the present invention and a Reference Example catalyst article.
Figure 5B:
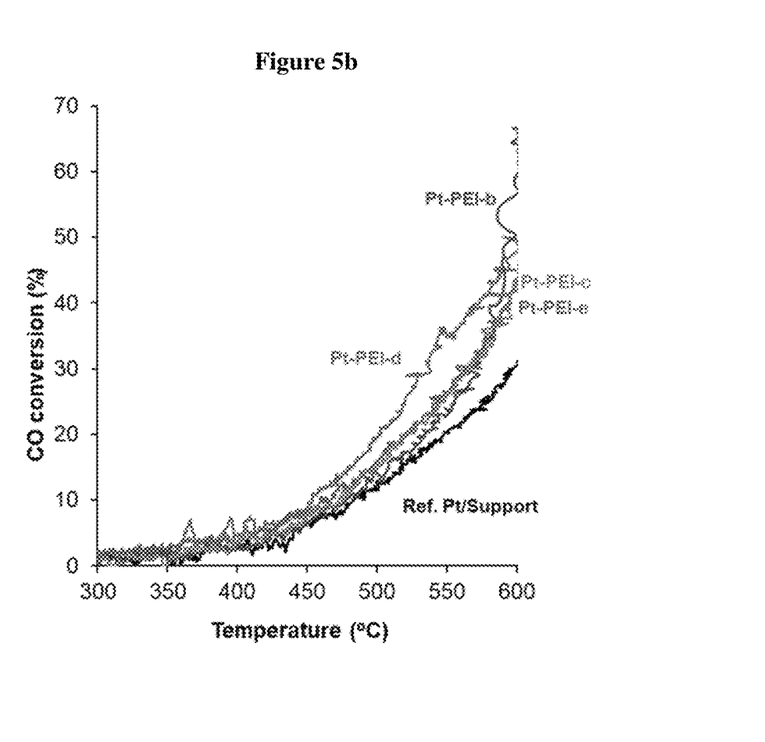
FIG. 5b shows CO conversion results of perturbated light-off performance testing of Example catalyst articles manufactured according to method of the present invention and a Reference Example catalyst article.
Figure 5C:
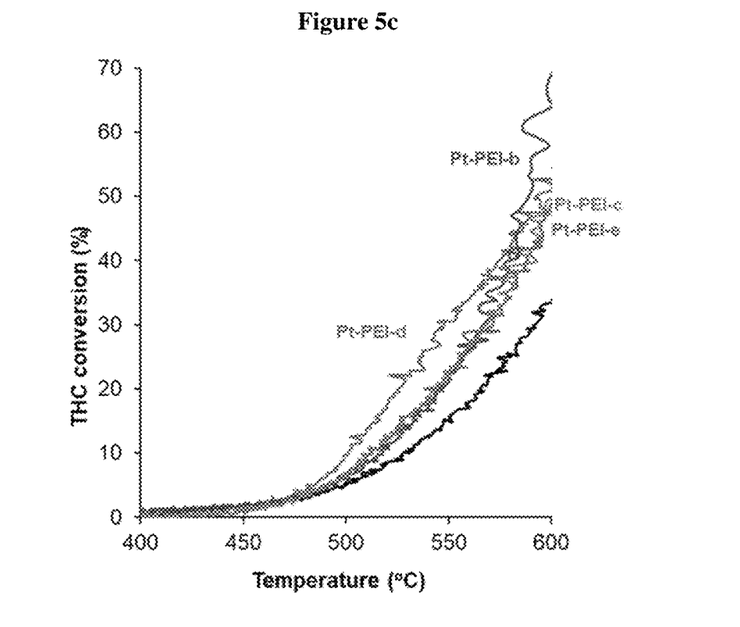
FIG. 5c shows THC conversion results of perturbated light-off performance testing of Example catalyst articles manufactured according to method of the present invention and a Reference Example catalyst article.

Similar improvements were observed in aged Pt catalysts on single support at low Pt loadings (Examples 14-18 in comparison to Reference Example 13). The results are shown in FIGS. 5a-5c for NO, CO, and THC conversions. (Aging condition: 1050° C./Hydrothermal/4 hr. Reaction condition: with rich pre-treatment, 150-700° C., $\lambda$=0.96~1.04, GHSV=200,000 $hr^{-1}$.) The TWC activity follows an order of Pt-PEI-d>b>c~e>Ref. Pt/single support.

Figure 6A:
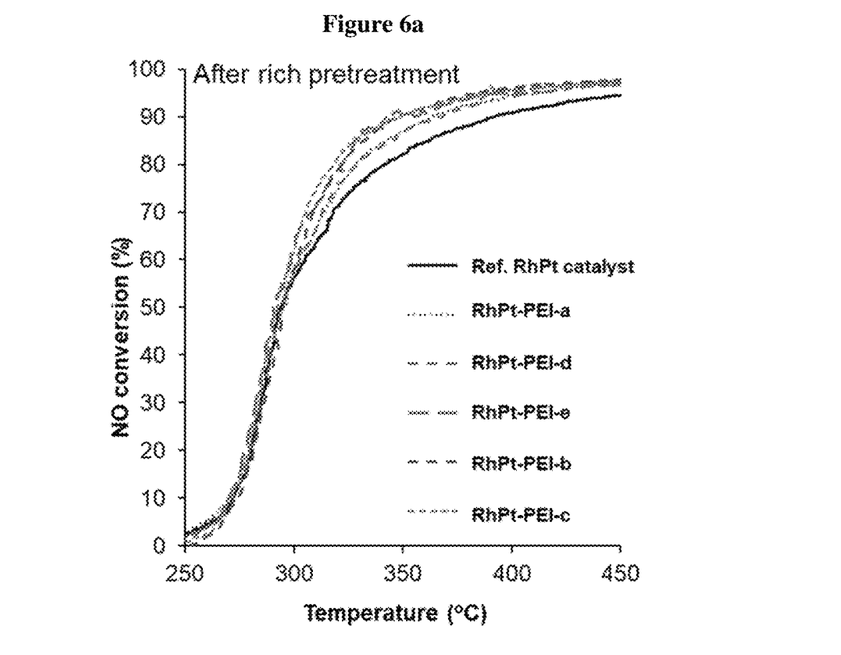
FIG. 6a shows NO conversion results of perturbated light-off performance testing of Example catalyst articles manufactured according to method of the present invention and a Reference Example catalyst article.
Figure 6B:
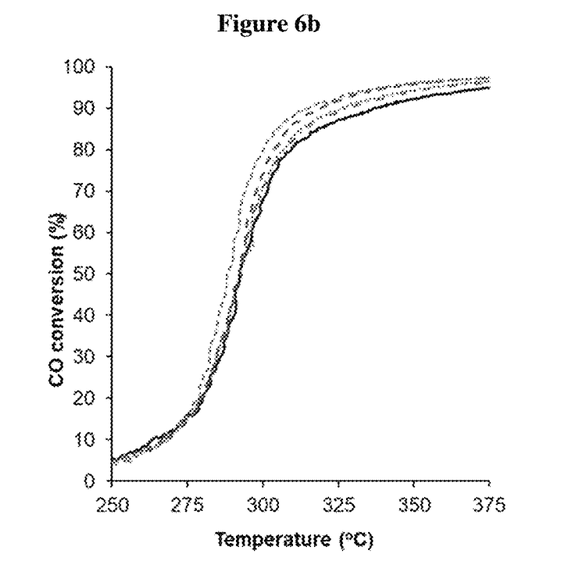
FIG. 6b shows CO conversion results of perturbated light-off performance testing of Example catalyst articles manufactured according to method of the present invention and a Reference Example catalyst article.
Figure 6C:
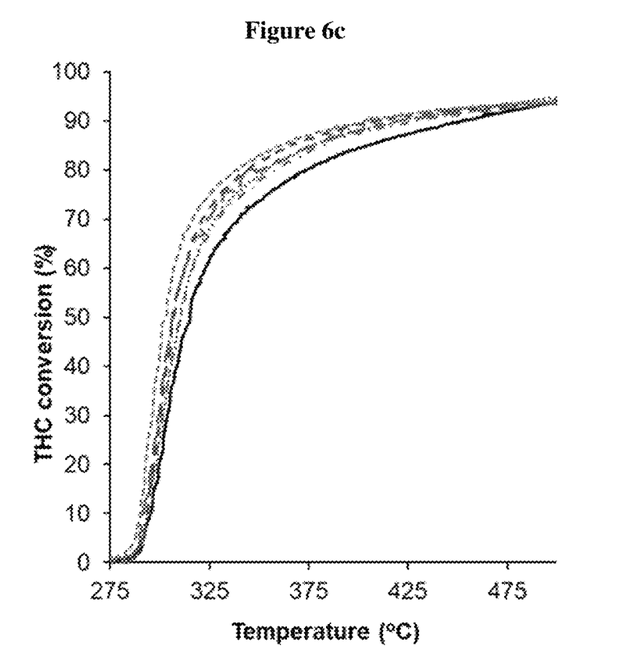
FIG. 6c shows THC conversion results of perturbated light-off performance testing of Example catalyst articles manufactured according to method of the present invention and a Reference Example catalyst article.

Similar improvements were observed in aged RhPt bimetallic catalysts at low PGM loading (Examples 20-24 in comparison to Reference Example 19). The results are shown in FIGS. 6a-6c for NO, CO, and THC conversions. (Aging condition: 1050° C./Hydrothermal/4 hr. Reaction condition: with rich pre-treatment, 150-700° C., $\lambda$=0.96~1.04, GHSV=200,000 $hr^{-1}$.) The TWC activity follows an order of RhPt-PEI-c>b>e>a>d>Ref. RhPt formulated catalysts.

The foregoing detailed description has been provided by way of explanation and illustration, and is not intended to limit the scope of the appended claims. Many variations in the presently preferred embodiments illustrated herein will be apparent to one of ordinary skill in the art and remain within the scope of the appended claims and their equivalents.

The invention claimed is:

1. A method of manufacturing a catalyst article, the method comprising:
   providing a complex of a polyamine and a PGM;
   providing a support material;
   applying the complex to the support material to form a loaded support material;
   disposing the loaded support material on a substrate; and
   heating the loaded support material to form nanoparticles of the PGM on the support material;
   wherein the complex has a PGM to amino group ratio of from 1:5 to 1:7.

2. The method of claim 1, wherein the polyamine comprises polyethyleneimine.

3. The method of claim 1, wherein the polyamine has a weight average molecular weight Mw of from 100 to 1,000,000 g/mol.

4. The method of claim 1, wherein the PGM is selected from one or more of rhodium, palladium and platinum.

5. The method of claim 1, wherein the support material comprises an oxide, preferably one of more of $Al_2O_3$, $SiO_2$, $TiO_2$, $CeO_2$, $ZrO_2$, $CeO_2$—$ZrO_2$, $V_2O_5$, $La_2O_3$ and zeolites.

6. The method of claim 5, wherein the alumina and/or ceria-zirconia is doped.

7. The method of claim 6, wherein the alumina and/or ceria-zirconia is doped with an oxide of one or more of lanthanum, neodymium, yttrium, niobium, praseodymium, hafnium, molybdenum, titanium, vanadium, zinc, cadmium, manganese, iron, copper, calcium, barium, strontium, caesium, magnesium, potassium and sodium, preferably one or more of lanthanum, neodymium and yttrium.

8. The method of claim 6, wherein the dopant is present in the alumina and/or ceria-zirconia in an amount of from 0.001 wt. % to 20 wt. %.

9. The method of claim 1, wherein the loaded support material is disposed on the substrate in the form of a slurry.

10. The method of claim 9, wherein the slurry is prepared by a method comprising:
    contacting a PGM salt and a polyamine in water to form the complex of a polyamine and a PGM in an aqueous solution;
    applying the complex to the support material to form a loaded support material by contacting the support material with the aqueous solution.

11. The method of claim 9, wherein the PGM comprises rhodium and the support material comprises alumina and ceria-zirconia.

12. The method of claim 9, wherein disposing the loaded support material on a substrate comprises contacting the slurry with the substrate, applying a vacuum to the substrate, and/or drying the slurry on the substrate.

13. The method of claim 12, wherein the drying occurs at a temperature of from 60° C. to 200° C.

14. The method of claim 1, wherein the substrate is in the form of a honeycomb monolith, a wall flow filter or a flow through filter.

15. The method of claim 1, wherein the heating is carried out:
    at a temperature of from 400° C. to 700° C.; and/or
    for from 10 to 360 minutes.

16. A catalyst article obtainable by the method of claim 1, the catalyst article for use in an emission treatment system.

17. The catalyst article of claim 16 comprises a bottom layer of support material having rhodium thereon and a top layer of support material having palladium thereon.

18. The catalyst article of claim 16 comprising a bottom layer of support material having palladium thereon and a top layer of support material having rhodium thereon.

19. The catalyst article of claim 17 comprising from 2 g/ft$^3$ to 15 g/ft$^3$ rhodium.

20. The catalyst article of claim 17 comprising from 50 g/ft$^3$ to 200 g/ft$^3$ palladium.

21. An emission treatment system comprising the catalyst article of claim 16.

22. The emission treatment system of claim 21 for a gasoline engine.

* * * * *